United States Patent [19]
Sugita et al.

[11] Patent Number: 6,157,788
[45] Date of Patent: *Dec. 5, 2000

[54] CAMERA BODY FOR A CAMERA HAVING A BATTERY STOWAGE CHAMBER DESIGN ENABLING THE OUTER HOUSING SHAPE OF THE CAMERA TO BE EASILY CHANGED WITHOUT THE NECESSITY FOR CHANGING THE SHAPE OF THE CAMERA BODY

[75] Inventors: Yukihiko Sugita, Kokubunji; Moriya Katagiri, Tokyo, both of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/922,147

[22] Filed: Aug. 25, 1997

[30] Foreign Application Priority Data

Sep. 4, 1996 [JP] Japan .................................. H8-234426

[51] Int. Cl.$^7$ ..................................................... G03B 17/02
[52] U.S. Cl. ............................................................... 396/539
[58] Field of Search ....................................... 396/535, 536, 396/539, 541, 542

[56] References Cited

U.S. PATENT DOCUMENTS

| | | | |
|---|---|---|---|
| 4,926,207 | 5/1990 | Eguchi et al. | 396/542 X |
| 5,581,321 | 12/1996 | Boyd | 396/535 |
| 5,682,571 | 10/1997 | Balling | 396/538 |

*Primary Examiner*—David M. Gray
*Attorney, Agent, or Firm*—Volpe and Koenig, P.C.

[57] ABSTRACT

A camera having a camera body unit including mainly a photographic lens frame, a front cover unit and back cover unit that are housing members for covering the outer circumference of camera body unit, a back lid unit to be opened or closed for loading film, and a battery lid for opening or closing a battery stowage chamber. The battery stowage chamber is formed inside the flank of a front cover that is an integral part of the front cover unit, and the battery lid is supported by a back cover that is an integral part of the back cover unit so that the battery lid can pivot freely. According to the camera having these components, a camera having any of various contours can be produced readily without loss of freedom in design.

14 Claims, 2 Drawing Sheets

CAMERA BODY FOR A CAMERA HAVING A BATTERY STOWAGE CHAMBER DESIGN ENABLING THE OUTER HOUSING SHAPE OF THE CAMERA TO BE EASILY CHANGED WITHOUT THE NECESSITY FOR CHANGING THE SHAPE OF THE CAMERA BODY

BACKGROUND OF THE INVENTION

1. Field of the Invention

The present invention relates to the structure of a battery stowage chamber in a camera.

2. Description of the Related Art

In a conventional camera, a battery stowage chamber is formed in a camera body in which a photographic lens, a film feed system, and a basic functional unit for carrying out photography, such as, a shutter mechanism are incorporated. The camera body is fixed and supported by a housing member. The outer circumferential surface of the camera body is covered with the housing member sandwiched between a front cover and back cover.

In the above conventional camera, since the battery stowage chamber requiring a certain size is formed in the camera body, the contour of the camera is determined with a position at which the battery stowage chamber is located. There is therefore a drawback that freedom in design is limited. Moreover, when an attempt is made to commercialize various types of cameras having different contours by changing the housing member, the kind of battery may be changed. However, there is difficulty in using, camera body. Eventually, each camera body must be redesigned.

OBJECT AND SUMMARY OF THE INVENTION

The present invention attempts to resolve the above drawback. An object of the present invention is to provide a camera capable of being remodeled easily in line with various contours without the loss of freedom in design.

A camera in accordance with the present invention comprises a camera body including at least a photographic lens, a film feed system, and a shutter mechanism, at least one housing member for covering the outer circumference of the camera body, and a battery stowage chamber formed in the housing member for stowing a driving supply battery.

According to the camera, since the battery stowage chamber is formed in the housing member, less restrictions are imposed on the shape of the camera body. Moreover, when an attempt is made to change the contour of the camera, the shape of the camera body need not be changed but the shape of the housing member alone should be changed. This is advantageous in terms of design and production cost.

Other features and advantages of the present invention will be apparent from the description below.

DESCRIPTION OF THE PREFERRED EMBODIMENT

An embodiment of the present invention will be described in conjunction with the drawings.

Figure 1:
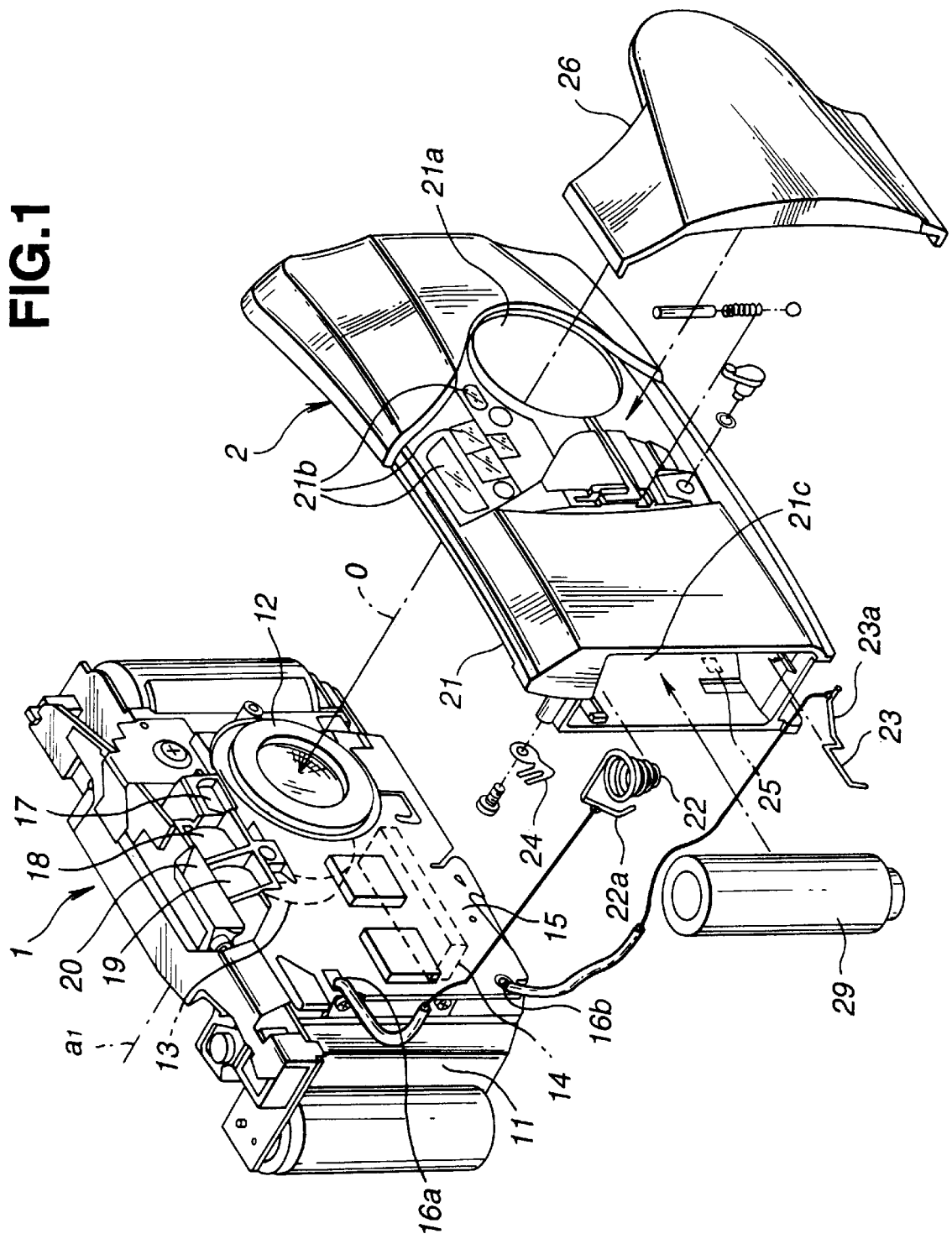
FIG. 1 is an exploded oblique view of a front cover unit and camera body unit of a camera in accordance with an embodiment of the present invention.
Figure 2:
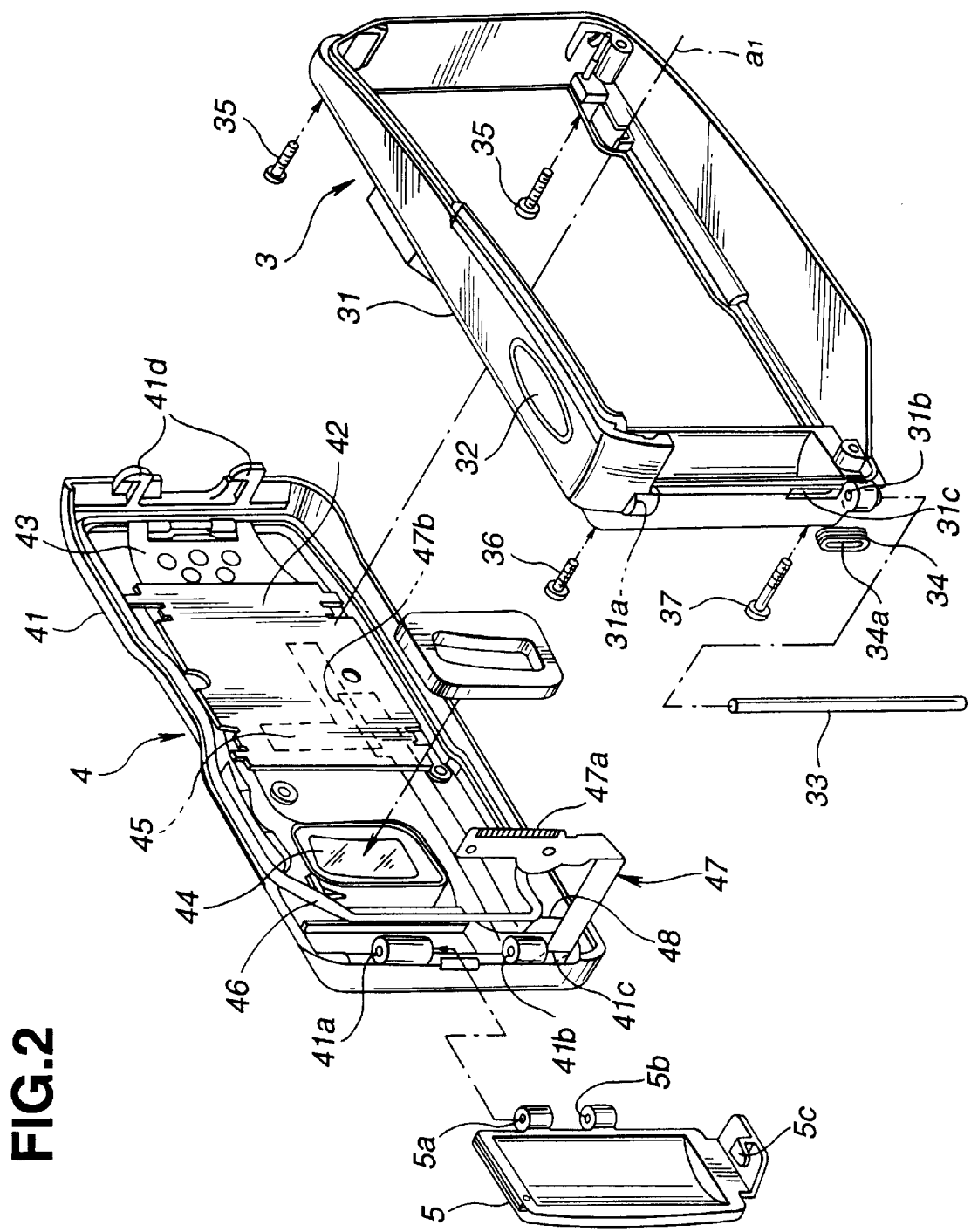
FIG. 2 is an exploded oblique view of a back cover unit, back lid unit, and battery lid of the camera shown in FIG. 1.

FIGS. 1 and 2 are exploded oblique views of a camera in accordance with an embodiment of the present invention. The camera of this embodiment comprises a camera body unit 1 including mainly basic functional members used to carry out photography, a front cover unit 2 and back cover unit 3 that are housing members for covering the outer circumference of the camera body unit 1, a back lid unit 4 to be opened or closed for loading film, and a battery lid 5.

The camera body unit 1 is composed of a camera body 11, and the basic functional members for carrying out photography which are incorporated in the camera body 11. The basic functional members include a photographic lens frame 12 for holding a photographic lens, a shutter mechanism 13, and a film feed driving mechanism 14 that is a film feed system. As other functional members to be incorporated, a viewfinder optical system 17, a strobe unit 20, and a rigid printed-circuit board 15 that is an electrical member placed in a direction orthogonal to the optical axis 0 of the photographic lens on the face of the camera body 11 opposed to and behind the front cover unit 2.

Formed on the printed-circuit board 15 are connection lands 16a and 16b that are contacts to be press-fitted into and connected to armatures placed on the front cover unit 2 for connecting the battery power supply.

The front cover unit 2 comprises a front cover 21 that is a first housing member for supporting the camera body unit, and a slide barrier 26 mounted on the front cover 21 so that the slide barrier can slide.

The front cover 21 has on the face thereof a photographic lens opening 21a to be opened or closed by sliding the slide barrier 26 and a group of windows 21b including a viewfinder window, range finder window, and strobe window. Furthermore, a battery stowage chamber 21c in which a battery 29 can be stowed is formed at the left-hand end of the front cover 21 relative to an object side. Inside the battery stowage chamber 21c, a battery armature 22 for connecting a negative electrode of a battery and a battery armature 23 for connecting a positive electrode thereof are attached.

The tips 22a and 23a of the battery armatures 22 and 23 used for connection are connected to pressure-welded armatures 24 and 25, which constitute a conducting means, formed on the back of the front cover 21 opposed to the camera body unit 1 and pressure-welded to the connection lands 16a and 16b on the printed-circuit board 15 and thus brought to a connected state in an assembled state.

Incidentally, lead wires may be substituted for the pressure-welded armatures 24 and 25, and soldered directly to the connection lands on the printed-circuit board 15.

The back cover unit 3 comprises a back cover 31 that is a second housing member shaped like a frame, a release button 32 formed on the back cover so that the release button can be pressed, an axis of rotation 33 for supporting the back lid unit 4 and battery lid 5 so that they can pivot freely, and a plastic bush 34 having a watertight insertion hole 34a for connecting a flexible printed-circuit board. The back cover unit 3 is fixed to the front cover 21 having the camera body unit 1 mounted therein using screws 35, 36, and 37.

The axis of rotation 33 is locked in upper and lower support holes 31a and 31b formed at the left-hand end of the back cover 31 relative to an object side. The bush 34 is fitted in an elongated watertight state into a through hole 31c substantially parallel to the axis of rotation 33 near the lower support hole 31*b*.

The back lid unit 4 comprises a back lid 41 that is a third housing member, a platen 42 attached to the back lid, a film presser 43, a peep window 44, a switch/display substrate 45, which is an electrical member, placed on the back of the platen opposed to the back lid and having a group of switch contacts used for setting a date and an LCD display, a packing 46, which is a plastic endless band shaped like a frame for surrounding an area in which the peep window 44 is located, affixed in a watertight state to the inside of the back lid 41, and a flexible printed-circuit board 47 for connection having a connector portion 47*a*, which can be electrically connected to the printed-circuit board 15 on the camera body unit 1 via a connector, at one end thereof and having a connector portion 47*b*, which can be electrically connected to the switch/display substrate 45 via a connector, at the other end thereof.

The back lid 41 has axis support holes 41*a* and 41*b*, into which the axis of rotation 33 can be fitted freely rotatably, at the left-hand end thereof relative to an object side. In an assembled state, the back lid 41 is supported by the back cover unit 3 so that the back lid 41 can pivot freely. A concave part 41*c* is formed below the axis support hole 41*b* so that the flexible printed-circuit board 47 for connection can pass through the concave part 41*c*. Two claws 41*d* capable of engaging with the back cover unit 3 are formed at the right-hand end of the back lid 41 relative to the object side.

The flexible printed-circuit board 47 for connection has the connector portion 47*a* thereof at one end thereof connected to the printed-circuit board 15 on the camera body unit 1 via a connector. In this state, the flexible printed-circuit board 47 is inserted in a watertight state into the insertion hole 34*a* of the bush 34 on the back cover 31, passed through the concave part 41*c* of the back lid 4, passed in the watertight state through the junction between the packing 46 and back lid 41, and run through the inside of the packing 46 on the inner surface of the back lid onto which a protective tape 48 is affixed. The flexible printed-circuit board 47 then has the connector portion 47*b* thereof at the other end thereof connected to the switch/display substrate 45 via a connector.

The battery lid 5 has axis support holes 5*a* and 5*b* which are inserted into the axis support holes 41*a* and 41*b* on the back cover 41 and into which the axis of rotation 33 can be fitted, and a stoppage claw 5*c*. In an assembled state in which the units are assembled, the battery lid 5 can pivot relative to the back cover unit 3 so as to open or close the battery stowage chamber 21*c* in the cover 21.

For assembling the units of the camera of this embodiment having the foregoing components, first, the camera body unit 1 is placed at a given position in the front cover unit 2 to which the slide cover 26 is attached.

The connector portion 47*a* at one end of the flexible printed-circuit board 47 is then connected to the connector on the printed-circuit board 15 on the camera body unit 1. The flexible printed-circuit board 47 is then inserted in a watertight state into the insertion hole 34*a* of the bush 34 on the back cover 31. Thereafter, the flexible printed-circuit board 47 is routed along the aforesaid path on the back cover 41, and then has the connector portion 47*b* thereof at the other end thereof connected to the switch/display substrate 45 in the back cover unit 4 via the connector.

The front cover unit 2, camera body unit 1, and back cover unit 3 are coupled with one another using the screws 35, 36, and 37. With the coupling, the connection lands 16*a* and 16*b* on the printed-circuit board 15 and the pressure-welded armatures 24 and 25 connected to the battery armatures 22 and 23 are pressure-welded to each other. Thus, an electrically-connected state is attained.

The back lid unit 4 with the battery lid 5 attached thereto is placed at a given position on the back cover unit 3. The axis of rotation 33 is inserted into the axis support holes 31*a* and 31*b* of the back cover 31, the axis support holes 41*a* and 41*b* of the back cover 41, and the axis support holes 5*a* and 5*b* of the battery lid 5. Thus, a mounted state is attained. The back lid unit 4 and battery lid 5 are supported by the back cover unit 2 so that they can pivot freely. Assembling the components of the camera is thus completed.

In the assembled state, the battery lid 5 is opened, a battery 29 is put into the battery stowage chamber 21*c* from the lateral side of the camera, and then the battery lid 5 is closed. Thus, a battery-loaded state is attained.

In the aforesaid camera of this embodiment, the battery stowage chamber requiring a certain size is not formed in the camera body 11 but formed at a lateral position in the front cover 21 that is a housing member of the camera body 11. The battery stowage chamber 21*c* is formed in the front cover 21, and the battery lid 5 for opening or closing the battery stowage chamber 21*c* is supported by the axis of rotation engaged with the back cover 41. Owing to this structure, less restrictions are imposed on the shape of the camera body in forming the battery stowage chamber and battery lid. Moreover, even when an attempt is made to change the contour of the camera, that is, the design of the appearance of the camera, or to change the kind of battery, the shape of the camera body need not be changed. Once the shape of the front cover or back cover is changed, the design of the camera is changed. This is advantageous in terms of design and production cost.

Moreover, electrical connection between the battery armatures for connecting a battery and the printed-circuit board on the camera body can be attained by assembling and coupling the front cover unit 2 and camera body unit 1. This obviates the necessity of separately carrying out the work of electrical connection. Assembling work is therefore simplified.

What is claimed is:

1. A camera, comprising:

a camera body including at least a photographic lens, a film feed system, a shutter mechanism, and a printed-circuit board; and a housing member at least partially covering said camera body and having a compartment formed in said housing member serving as a battery stowage chamber in which battery armatures are placed, a battery mounted in said chamber, which chamber encloses said battery independently of said camera body, said battery armatures being mounted to said housing member in said battery stowage chamber and provided to electrically connect said battery to said panted-circuit board provided in said camera body, and a conducting means for enabling said battery armatures and printed-circuit board to conduct.

2. A camera according to claim 1, wherein said armatures are pressure-welded armatures pressure-welded and said conducting means are fixed between said printed-circuit board and battery armatures when said camera body and housing member are assembled.

3. A camera according to claim 1, wherein said conducting means comprises lead wires for electrically connecting said battery armatures and printed-circuit board.

4. A camera according to claim 1, wherein said conducting means is a flexible printed-circuit board for electrically connecting said battery armatures and printed-circuit board.

5. A camera according to claim 2, wherein said printed-circuit board is a rigid substrate and has lands that complete an electrical path when connected to said pressure-welded armatures.

6. The camera of claim 1 further comprising a second housing member partially covering a portion of said camera body not covered by said first mention movably housing member and having a mounted cover lid for selectively covering and uncovering said battery compartment to enclose said battery independently of said camera body.

7. A camera comprising:
- a camera body that is an assembly including at least a photographic lens and an electrical circuit for controlling a function in the camera; and
- a housing part covering at least part of said camera body and having a compartment formed in said housing member serving as a battery chamber in which armatures are placed, said battery chamber for stowing a battery serving as a power supply for the electrical circuit of said camera, which chamber encloses said battery independently of said camera body, said battery armatures being mounted to said housing member in said battery stowage chamber and electrically connecting said battery to said electrical circuit.

8. A camera comprising:
- a camera body including at least a photographic lens, a film feed system, and a shutter mechanism and an electrical circuit for controlling a function in the camera;
- at least one housing member for covering the outer circumference of said camera body; and
- a compartment formed in said one housing member and serving as a battery stowage chamber for receiving a battery for serving as a power supply for said electrical circuit, which chamber encloses said battery independently of said camera body, and battery armatures being mounted to said housing member in said battery stowage chamber and electrically connecting said battery to said electrical circuit.

9. A camera according to claim 8, wherein said one housing member is a front cover for covering a face of said camera body.

10. A camera according to claim 8, wherein said one housing member is a front cover for covering a face of said camera body, and said battery stowage chamber is located at one end of said front cover.

11. A camera according to claim 8, wherein said one housing member is a front cover for covering a face of said camera body, and said battery chamber is formed at an end of said front cover so that when said front cover is mounted on said camera body, said battery stowage chamber is located inside a flank of said camera body.

12. A camera, comprising:
- a camera body including at least a photographic lens, a film feed system, a shutter mechanism and an electrical circuit for controlling a camera function;
- a front housing member covering an outer side of said camera body and having a compartment formed in said housing member serving as a battery stowage chamber formed at one end thereof;
- said battery stowage chamber enclosing a battery therein independently of said camera body and having armatures for electrically connecting said battery to said electrical circuit, said armatures being mounted to said front housing member in said battery stowage compartment;
- a back housing member located on a back of said camera body; and
- a battery lid arranged on said back housing member so that said battery lid pivots relative to said back housing member so as to open or close said battery stowage chamber formed in said front housing member.

13. A camera, comprising:
- a camera body including at least a photographic lens, a film feed system, and a shutter mechanism;
- a front side housing member having a battery stowage chamber formed at a front end thereof and coupled with a front side of said camera body;
- a middle housing member coupled with said front side housing member for housing said camera body;
- a rear side housing member formed so that said rear side housing member can pivot between a position, at which a part in said camera body extending into said middle housing member is optically closed, and a position at which said part is opened;
- a battery lid arranged on said middle housing member so that said battery lid pivots between a position, at which said battery stowage chamber is closed, and a position at which said battery stowage chamber is opened; and
- a rotation axis with which said middle housing member is provided, said rear side housing member and said battery lid being commonly supported by said rotation axis.

14. A camera, comprising:
- a camera body;
- a first housing member placed on one side of said camera body and having a battery stowage chamber formed at one end thereof;
- a battery lid movable to a position, at which said battery stowage chamber is closed, and a position at which said battery stowage chamber is opened;
- a second housing member coupled with said first housing member for housing said camera body; and
- a third housing member coupled with said battery lid and having a common axis of rotation with said battery lid so that said third housing member can pivot between a position, at which said camera body is closed, and a position at which said camera body is opened.

* * * * *